United States Patent [19]

Tachi et al.

[11] Patent Number: 5,443,874
[45] Date of Patent: Aug. 22, 1995

[54] HOLLOW MULTI-LAYER MOLDING

[75] Inventors: Kazuhisa Tachi; Takeshi Okamoto; Mikiko Muramatsu, all of Mie, Japan

[73] Assignee: Mitsubishi Petrochemical Co., Ltd., Tokyo, Japan

[21] Appl. No.: 235,336

[22] Filed: Apr. 29, 1994

[30] Foreign Application Priority Data

May 24, 1993 [JP] Japan .................. 5-121643

[51] Int. Cl.⁶ .................. B29D 22/00; B32B 1/02; B32B 27/08
[52] U.S. Cl. .................. 428/36.7; 428/36.6; 428/476.1; 428/483; 428/516
[58] Field of Search .................. 428/36.7, 36.6, 476.1, 428/483, 516

[56] References Cited

U.S. PATENT DOCUMENTS

| | | | |
|---|---|---|---|
| 3,324,095 | 6/1967 | Carrick et al. | 526/127 |
| 4,451,512 | 5/1984 | Yazaki et al. | 428/36.7 |
| 4,888,222 | 12/1989 | Gibbons et al. | 428/36.7 |
| 4,921,733 | 5/1990 | Gibbons et al. | 428/36.7 |
| 5,186,875 | 2/1993 | Fukuhara | 264/37 |
| 5,230,935 | 7/1993 | Delimoy et al. | 428/36.7 |

FOREIGN PATENT DOCUMENTS

| | | |
|---|---|---|
| 0393204 | 10/1990 | European Pat. Off. |
| 0461836 | 12/1991 | European Pat. Off. |
| 2052573 | 5/1971 | Germany . |
| 3123303 | 12/1982 | Germany . |
| 1332510 | 10/1973 | United Kingdom . |

OTHER PUBLICATIONS

Database WPI, Derwent Publications Ltd., AN 86-172727, JP-A-61104952, May 23, 1986.
Database WPI, Derwent Publications Ltd., AN 82-10631E, JP-A-56167518, Dec. 23, 1981.

*Primary Examiner*—Thomas Hamilton, III
*Attorney, Agent, or Firm*—Oblon, Spivak, McClelland, Maier, & Neustadt

[57] ABSTRACT

A hollow multi-layer molding made of a multi-layer laminate material, the multi-layer laminate material having: a polyethylene layer; a barrier layer made of a substance selected from the group consisting of polyamide resins, saponified derivatives of ethylene-vinyl acetate copolymers, thermoplastic polyesters, and a mixture of at least two of the polyamide resin, the saponified derivative and the thermoplastic polyesters; and an adhesive layer made of a modified polyolefin resin, the polyethylene layer and the barrier layer being laminated to each other with the adhesive layer sandwiched therebetween. The polyethylene layer is made of a high-molecular-weight polyethylene which is obtained by using a specific chrome catalyst and a reducing agent, and which has a high-load melt flow rate (at a temperature of 190° C. under a load of 21.6 kg) of 1 to 10 g/10 min., and a density of not less than 0.935 g/cm³. The hollow multi-layer molding has excellent barrier properties with respect to vehicle fuels and excellent mechanical strength, such as impact strength, and is capable of being produced while allowing improved reclaiming of flash and the like.

9 Claims, No Drawings

HOLLOW MULTI-LAYER MOLDING

BACKGROUND OF THE INVENTION

1. Field of the Invention

The present invention relates to a hollow multi-layer molding, and particularly to a hollow multi-layer molding that has excellent barrier properties (permeation-preventing properties) with respect to vehicle fuels (such as gasoline) and mixtures of hydrocarbons with oxygen-containing organic compounds (such as gasoline containing alcohol, i.e., gasohol), has excellent mechanical strength, such as impact strength, and is capable of being produced while allowing flash or the like to be recovered and reused (i.e., reclaimed) in an improved manner.

2. Description of the Related Art

Fuel tanks for vehicles have, through various approaches, been made of plastic materials by using blow molding techniques so as to achieve advantages such as improved safety upon impact, and improved freedom of shape design.

Properties required of plastic products to be used as fuel tanks include excellent properties for preventing permeation of fuel (gas barrier properties), and mechanical strength, such as impact strength, sufficient to be able to serve as fuel tanks.

Polyolefin, which is relatively cheap and which has excellent impact strength and similar mechanical strengths, is a material which may be suitably used to produce plastic fuel tanks. However, since polyolefin has poor gas barrier properties, various improvements have been proposed.

These proposals include a chemical treatment method in which the inner surface of a polyolefin tank is chemically treated with fluorine gas ($F_2$) or sulfur trioxide gas ($SO_3$), and a laminar method in which layers of modified polyamide comprising a combination of polyamide having relatively good barrier properties and polyolefin substituted by an alkylcarboxyl group, are formed in a continuous matrix phase of polyolefin.

However, these methods are not yet capable of assuring barrier properties sufficient for this use, and cannot be regarded as perfect since it may not be easy, with these methods, to cope with various environmental protection legal regulations which are expected to be more strict in the future. In addition, the laminar method has a problem in that the laminar state of modified polyamide tends to be unstable under some forming conditions, thereby involving the risk of reducing impact strength. The chemical treatment method has problems concerning the durability of treatment effect and a problem concerning environmental protection during the process.

Another proposal is made, for example, in Japanese Patent Publication No. 1-14049, which is a multi-layer formation method. In this method, a barrier layer made of a material having excellent gas barrier properties, such as a polyamide resin, a saponified derivative of an ethylene-vinyl acetate copolymer, or a thermoplastic polyester, is laminated to a polyolefin layer serving as the main layer with an adhesive layer of a modified polyolefin sandwiched between the main layer and the barrier layer.

This method provides products having much superior gas barrier properties. However, it is necessary, from an economical point of view, that a high proportion of reclaimed material, such as the multi-layer flash generated during molding, be mixed with virgin material (the proportion in weight of reclaimed material with respect to the total weight of the materials, however, generally being not more than 50% because reclaimed material may make product quality unstable if mixed at a proportion exceeding 50% by weight). Since such reclaiming decreases mechanical strength, such as impact strength, this strength needs to be further improved so as to be able to compensate for the decrease.

SUMMARY OF THE INVENTION

An object of the present invention is to provide a hollow multi-layer molding that has sufficient gas barrier properties for meeting requirements for vehicle fuel tanks and the like, allows flash or like material to be reclaimed, and has excellent mechanical strength, such as impact strength upon collision, even when produced by using a high proportion of reclaimed resin (which proportion, however, is not more than 50% of the total weight of the reclaimed resin and a quantity of virgin material to be mixed therewith).

The present inventors have made various studies in view of the above-described circumstances, finding that the object of the present invention can be achieved if a polyethylene layer to serve as the main layer is formed by using a high-molecular-weight polyethylene which is in turn obtained by using a specific catalyst. The present invention has been formulated on the basis of this knowledge.

A hollow multi-layer molding according to the present invention is characterized in that the molding is made of a multi-layer laminate material, the multi-layer laminate material having: a polyethylene layer; a barrier layer made of a substance selected from the group consisting of polyamide resins, saponified derivatives of ethylene-vinyl acetate copolymers, thermoplastic polyestesr, and a mixture of at least two of the polyamide resin, the saponified derivative and the thermoplastic polyester; and an adhesive layer made of a modified polyolefin resin and sandwiched between the polyethylene layer and the barrier layer so that the polyethylene layer and the barrier layer are laminated to each other with the adhesive layer therebetween.

The polyethylene layer is made of a high-molecular-weight polyethylene obtained by using a reducing agent and a chrome catalyst expressed as $$CrO_3$$

or by one of formulae (I) and (II):

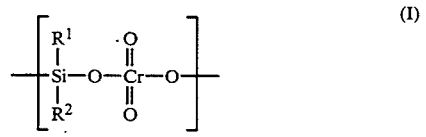

(where $R^1$ and $R^2$ each represent a hydrocarbon group having 1 to 14 carbons),

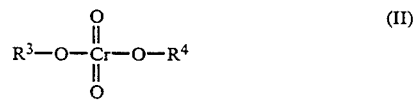

(where $R^3$ and $R^4$ each represent a steric hindrance polyalicyclic hydrocarbon having 7 to 20 carbons).

The high-molecular-weight polyethylene has a high-load melt flow rate (at a temperature of 190° C. under a load of 21.6 kg) of 1 to 10 g/10 min., and a density of not less than 0.935 g/cm³.

The polyethylene layer may contain flash generated during the molding of the multi-layer laminate material into the hollow multi-layer molding.

DETAILED DESCRIPTION OF THE INVENTION

As shown in U.S. Pat. No. 3,324,095, British Patent No. 1,051,39, British Patent No. 1,332,510, British Patent No. 241,134, and U.S. Pat. No. 3,642,749, a high-molecular-weight polyethylene used in the present invention is obtained by polymerizing ethylene by using a chrome catalyst and a reducing agent, the chrome catalyst being expressed as

or by one of formulae (I) and (II):

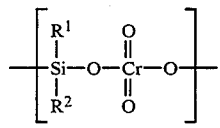

(where $R^1$ and $R^2$ each represent a hydrocarbon group having 1 to 14 carbons),

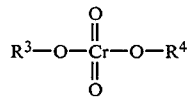

(where $R^3$ and $R^4$ each represent a steric hindrance polyalicyclic hydrocarbon having 7 to 20 carbons).

The above-identified five patents are incorporated here as references.

A preferable form of chrome compound which may be used as the chrome catalyst is bis(tri(hydrocarbyl)silyl) chromate expressed by the following formula (III):

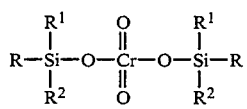

(where R, $R^1$ and $R^2$ each represent a hydrocarbon group having 1 to 14 carbons).

Preferable examples of bis (tri (hydrocarbyl) silyl) chromate include bis (tri(phenyl)silyl) chromate, bis(tri(methylnaphthyl)silyl) chromate, bis(tri(ethylphenyl)silyl) chromate, bis(tri(naphthyl)silyl) chromate, bis(tri(xylyl)silyl) chromate, and bis(tri(tolyl)silyl) chromate. Among these examples, bis(tri(phenyl)silyl) chromate is particularly preferable.

Another preferable form of chrome compound which may be used as the chrome catalyst is dialkyl chromate (expressed by formula (II)), such as diadamantyl chromate (expressed by the following formula (IV)), di-2-alkylbornyl chromate (expressed by the following formula (V)), or di-2-alkylfenchyl chromate (expressed by the following formula (VI)). Among these, diadamantyl chromate is particularly preferable.

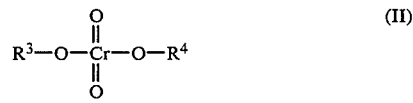

(where $R^3$ and $R^4$ each represent a steric hindrance polyalicyclic hydrocarbon having 7 to 20 carbons)

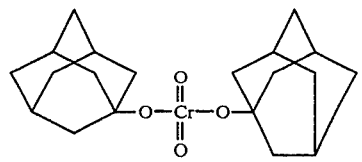

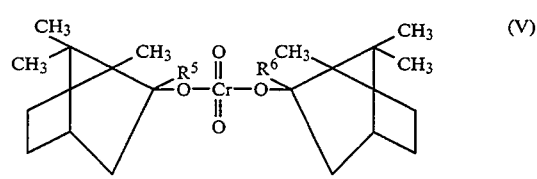

(where $R^5$ and $R^6$ each represent a hydrocarbon group)

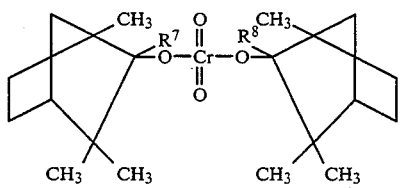

(where $R^7$ and $R^8$ each represent a hydrocarbon group)

The chrome catalyst used in the present invention is generally prepared in tile state of retention by a porous inorganic oxide, such as silica.

A preferable form of the reducing agent used in the present invention is alkylaluminum alkoxide expressed by the following general formula:

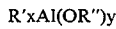

(where x and y are integers of 1 or 2 which total 3; and R' and R" each represent a hydrocarbon group having 1 to 14 carbons).

The types of hydrocarbon groups which may be contained include alkyl groups, aralkyl groups, aryl groups, alkaryl groups, alicyclic hydrocarbon groups, bicyclic hydrocarbon groups, and similar hydrocarbon groups. The reducing agent may comprise either one of such alkylaluminum alkoxides or a mixture of two or more thereof.

The catalyst used in the present invention satisfies a molar ratio between aluminum atoms in the reducing agent and chromium atoms in the chrome catalyst (hereinafter referred to as "the Al/Cr ratio") within a range of from 100 to 0.5, preferably from 15 to 1.0, and more preferably from 5.0 to 1.0.

Methods which may be used to polymerize ethylene by using the above-described catalyst and the reducing agent include known suspension polymerization methods, known solution methods, and known gaseous phase methods (one of which is described in U.S. Pat. No. 4,363,904). Ethylene may be either homopolymerized or copolymerized with one or more α-olefins.

α-Olefin(s) which may be used for this purpose are those having 3 to 18 carbon atoms, such as propylene, butene-1, pentene-1, 3-methylbutene-1, hexene-1, 4-methylpentene-1, 4-methylhexene-1,4, 4-dimethylpentene-1, heptene-1, octene-1, nonene-1, and decene-1. Among these, propylene, butene-1, hexene-1, 4-methylpentene-1, and octene-1 are preferable.

The thus obtained polyethylene should have a specific high-load melt flow rate (at a temperature of 190° C. under a load of 21.6 kg), and a specific density.

The high-load melt flow rate should be within a range of from 1 to 10 g/10 min., and preferably from 3 to 8 g/10 min. A high-load melt flow rate less than 1 g/10 min. causes poor moldability (poor plasticity) during blow molding, and tends to impair the external appearance of products. A high-load melt flow rate exceeding 10 g/10 min. also impairs moldability (drawdown ability) during blow molding.

The density of the polyethylene should not be less than 0.935 g/cm$^3$, and preferably should be within the range of from 0.940 to 0.970 g/cm$^3$. A density less of than 0.935 g/cm$^3$ is not preferable because it decreases the rigidity (buckling strength) of the hollow multi-layer moldings. A density exceeding 0.970 g/cm$^3$ tends to decrease the impact strength of the hollow multi-layer moldings.

A hollow multi-layer molding according to the present invention has a barrier layer made of a resin selected from among polyamide resins, saponified derivatives of ethylene-vinyl acetate copolymers, thermoplastic polyesters, and a mixture of at least two of the polyamide resin, the saponified derivative and the thermoplastic polyester.

Examples of polyamides which may be used include: polyamide resins prepared from aliphatic, alicyclic, and aromatic diamines (e.g., hexamethylenediamine, decamethylenediamine, dodecamethylenediamine, 2,2,4- or 2,4,4-trimethylhexamethylenediamine, 1,3- or 1,4-bis(aminomethyl)cyclohexane, bis(p-aminocyclohexylmethane), and m- or p-xylylenediamine) and aliphatic, alicyclic or aromatic dicarboxylic acids (e.g., adipic acid, suberic acid, sebacic acid, cyclohexanedicarboxylic acid, terephthalic acid, and isophthalic acid); polyamide resins prepared from aminocarboxylic acids (e.g., 6-aminocaproic acid, 11-aminoundecanoic acid, and 12-aminododecanoic acid); polyamide resins prepared from ε-caprolactam, ω-dodecalactam, and ω-laurolactam; copolymerized polyamide resins containing at least two of the above polyamide resins; and mixtures of at least two of the above polyamide resins.

Specific examples of polyamides which may be used include copolymers such as nylon 6, nylon 66, nylon 610, nylon 11, nylon 12, nylon 612, nylon 46, nylon MXD 6, and nylon 6/66.

Polyamides, such as above, may be used in the form of being combined with a substance for improving bonding properties of the barrier layer, which substance is obtained by modifying, with an unsaturated carboxylic acid or anhydride thereof, an olefin-containing elastomer (such as ethylene-propylene copolymer or ethylene-butene copolymer) comprising a copolymer rubber containing two or more α-olefins selected from among ethylene, propylene, butene-1, hexene-14-methylpentene, and the like. This is a preferable form of the polyamide according to the present invention.

The chemical composition of the saponified derivative of ethylene-vinyl acetate copolymer (hereinafter referred to as "saponified EVA" unless otherwise specified) according to the present invention is not particularly specified. However, from the viewpoint of barrier properties with respect to fuels, the saponified EVA is preferably a substance obtained by saponifying ethylene-vinyl acetate copolymer containing 25 to 50 mole % of ethylene (i.e., the number of moles of ethylene amounting to 25 to 50% of the total number of moles of the EVA) in such a manner that not less than 93%, preferably not less than 96%, of the EVA is saponified.

The thermoplastic polyester according to the present invention is obtained by polycondensation of a saturated dibasic acid and a glycol. Examples of thermoplastic polyesters which may be used include: polyethylene terephthalate obtained from ethylene glycol and terephthalic acid; polyethylene terephthalate copolymers obtained by using saturated dibasic acids (e.g., phthalic acid, isophthalic acid, sebacic acid, adipic acid, azelaic acid, glutaric acid, succinic acid, and oxalic acid) as copolymerization components; polyethylene terephthalate copolymers obtained by using diol components (e.g., 1,4-cyclohexane dimethanol, diethylene glycol, and propylene glycol) as copolymerization components; and polybutylene terephthalate obtained through the reaction between terephthalic acid or dimethyl terephthalate and 14-butanediol.

Further, a combination of a plurality of thermoplastic polyesters selected from among those listed above, or a polymer alloy of a thermoplastic polyester, such as above, with an ethylene-containing polymer or a rubber-like polymer may be used so long as barrier properties and resistance to chemicals (e.g., resistance to contents, such as gasoline) are not impaired.

Among the above-listed examples, polyethylene terephthalate and polybutylene terephthalate are preferable.

A hollow multi-layer molding according to the present invention has an adhesive layer made of a modified polyolefin comprising a polyolefin modified with an unsaturated carboxylic acid or anhydride thereof.

Examples of unsaturated carboxylic acids and anhydrides thereof which may be used include: monocarboxylic acids, such as acrylic acid and methacrylic acid; dicarboxylic acids, such as maleic acid, fumaric acid and itaconic acid; dicarboxylic anhydrides, such as maleic anhydride and itaconic anhydride. Among these, acrylic acid and maleic anhydride are preferable. Especilly, maleic anhydride is most preferable.

The polyolefin, which is to be modified by an unsaturated carboxylic acid or anhydride thereof, may comprise a polyolefin such as an ethylene homopolymer, an ethylene-α-olefin copolymer, or polypropylene. It is preferable, from the viewpoint of increasing bonding properties, that the same polyolefin that forms the polyethylene layer serving as the main layer, be used.

It is preferable that the modified polyolefin contain an unsaturated carboxylic acid or its anhydride in an amount of 0.005 to 10% by weight (percentages by weight will hereinafter be abbreviated to "wt %"). Modification methods which may be used include a method in which a polyolefin and a modifier, selected from among the above-described types, are melted and kneaded in an extruder, or a method in which a selected unsaturated carboxylic acid or anhydride thereof is added to a selected polyolefin suspended in a suitable continuous phase, and these substances are stirred together while heated.

Each of resins forming the layers according to the present invention may contain various additives and/or fillers in an amount within a range that does not involve any substantial reduction in the effects achievable with the present invention. Examples of additives which may be contained include antioxidants, ultraviolet light absorbers, thermal-processing stabilizers, colorants, lubricants, flame retardants, antistatic agents, nucleating agents. Examples of fillers which may be contained includes zeolite, talc, calcium carbonate and the like.

A hollow multi-layer molding according to the present invention is produced by using the resins, described above, for forming various layers so that the molding has a multi-layer structure at least including three layers comprising a polyethylene layer, a barrier layer made of a polyamide resin, a saponified EVA, and/or a thermoplastic polyester, and an adhesive layer made of a modified polyolefin resin, the polyethylene layer and the barrier layer being laminated to each other with the adhesive layer therebetween. A preferable form of the multi-layer structure at least including three layers is a three-type five-layer laminate structure in which a polyethylene layer, an adhesive layer, a barrier layer, another adhesive layer, and another polyethylene layer are subsequently disposed in this order.

The thickness of each layer in the multi-layer structure is suitably selected in accordance with the intended use as well as the required properties such as gas barrier properties and mechanical strength. When the hollow multi-layer molding is to be used as a fuel tank for vehicles, both the barrier layer and the adhesive layer generally have a thickness amounting to 2 to 4% of the total thickness of the structure.

If that thickness is less than 2% of the total thickness, gas barrier properties may be insufficient, and molding may tend to be difficult. If the thickness ratio exceeds 4%, gas barrier properties may not be improved as much as expected, and mechanical strength may be impaired. In addition, a thickness ratio exceeding 4% may increase material costs, and may cause an excessively large barrier-material content in reclaimed material.

A hollow multi-layer molding according to the present invention is produced in the following manner. Resins for forming various layers of the molding are individually supplied to extruders connected to a blow molding machine. After the resins are melted and plastified, they are extruded through multi-layer extruder dies so as to obtain a multi-layer molten parison having layers uniformly stacked on each other with no irregularities therebetween. Then, the parison is blow-molded in a mold having a desired configuration.

Flash or like material generated during molding may be reclaimed. When reclaiming flash, etc., after it has been recovered, it is added either as a part of the material for forming one of the plurality of layers or as a material for forming an additional layer substantially completely made of the reclaimed material.

In order to reuse flash, etc. generated during molding, it is normally processed in the following manner: after the flash, etc. has been mechanically crushed, it is melted and kneaded with a biaxial kneader or the like, and formed into pellets of reclaimed material; the reclaimed-material pellets are mixed with virgin pellets of, for example, polyethylene, at a proportion within a range of from 10 to 50 wt % with respect to the total of the pellets. Thus, flash, etc. is reclaimed as a part of the material for forming the polyethylene layer in this example. According to the present invention, since the polyethylene layer of a hollow multi-layer molding is made of a high-molecular-weight polyethylene obtained by using a specific catalyst, it is possible to reclaim flash, etc. in the material for forming the polyethylene layer at a proportion higher than the conventional value by mixing reclaimed pellets with virgin pellets at a proportion ranging, for example, from 30 to 50% by weight, both inclusive.

In general, flash or the like generated during the molding of hollow multi-layer moldings is in the form of multi-layer objects containing barrier resin. As a result, when the flash or the like is crushed and melted for the purpose of reclaiming them, the barrier-resin component does not finely disperse in the melt, thereby creating the problem that a hollow multi-layer molding produced by using a resin material containing the reclaimed flash, etc. has impaired mechanical strength. When the melt of the flash, etc. is kneaded with a high shearing force so as to finely disperse the barrier-resin component, the high-molecular-weight polyethylene and the barrier resin per se are degraded by heat and high sharing force, with the result that the physical properties of the products are impaired. On the other hand, when the melt is subjected to such a low shearing force that it is only kneaded insufficiently, the barrier-resin component cannot be finely dispersed as particles having a size of 100 μm or less, thereby resulting in impaired physical properties as in the above case. Thus, complete reclaiming thereof has not been accomplished conventionally.

In contrast, when flash or the like generated during the molding of hollow multi-layer molded products according to the present invention is formed into reclaimed-material pellets by crushing the flash, etc., and melting and kneading it in such a manner as to finely disperse the barrier-resin component, and the reclaimed-material pellets are mixed with the material resin for forming the polyethylene layer, the reclaimed material causes very small decreases in the mechanical strength or the like of another batch of products even if flash, etc. is repeatedly reclaimed at a normal proportion of 50 wt % or less.

[EXAMPLES]

The present invention will now be described specifically by use of the following examples. Examples 1 to 5

In each of Examples 1 to 5 of the present invention, hollow multi-layer moldings were produced by using the materials and methods described below, and certain properties of the moldings were evaluated by performing the tests described below.

(1) Materials

Resins for Forming Polyethylene Layers

Materials for forming the polyethylene layers of the moldings were prepared as follows:

<1> Preparation of High-molecular-weight Polyethylene

With reference to the examples described in British Patent No. 1,332,510, a catalyst composition (hereinafter referred to as "Catalyst 1") having an Al/Cr ratio of 1.5 was prepared by using the following materials: 785 g of silica ("Davison 952", produced by Davison Co.; sieved to have an average particle size of 50 μm and sintered at 300° C. for 24 hours) in 4 l of dehydrated hexane; 20 g of bis(tri(phenyl)silyl) chromate; and 6 g of diethylaluminum ethoxide.

Copolymerization was performed by using Catalyst 1 and a fluidized-bed gaseous-phase polymerization method described in U.S. Pat. No. 4,363,904. Specifically, ethylene was copolymerized with butane-1, serving as a comonomer, at a polymerization temperature of 99° C., a partial pressure of ethylene of 13 kg/cm$^2$ abs., a ratio of the partial pressure of hydrogen with respect to that of ethylene of 0.02, and a ratio of the partial pressure of butene-1 with respect to that of ethylene of 0.006. Then, the resultant copolymer was formed into pellets. Thus, an ethylene-butane copolymer to serve as a high-molecular-weight polyethylene (hereinafter referred to as "PE-1") was obtained. PE-1 had a high-load melt flow rate of 5 g/10 min., and a density of 0.948 g/cm$^3$.

<2> Preparation of High-molecular-weight Polyethylene (PE-2)

Another catalyst composition (hereinafter referred to as "Catalyst 2") having an Al/Cr ratio of 5.0 was prepared in the same manner as the preparation of Catalyst 1 except that 20 g of diethylaluminum ethoxide was used.

Then, copolymerization was performed by using Catalyst 2 in the same manner as above except that a polymerization temperature of 102° C., and a ratio of the partial pressure of butene-1 with respect to that of ethylene of 0.007 were used, thereby obtaining an ethylene-butene copolymer to serve as another high-molecular-weight polyethylene (hereinafter referred to as "PE-2"). PE-2 had a high-load melt flow rate of 7 g/10 min., and a density of 0.948 g/cm$^3$.

Resins for Forming Barrier Layers

Materials used as resins for forming the barrier layers were the following: nylon 6 having a relative viscosity (measured in accordance with Japanese Industrial Standards (JIS) K6810) of 6.2, and a melting point (measured by differential scanning calorimetry (DSC)) of 225° C. (hereinafter referred to as "BR-1"); nylon 6/66 copolymer having a relative viscosity of 4.3, and a melting point of 195° C. (hereinafter referred to as "BR-2"); saponified ethylene-vinyl acetate copolymer ("EVAL", trade name, produced by Kuraray Co., Ltd.) having a melt flow rate (at 190° C. under a load of 2.16 kg) of 1.3 g/10 min., and containing 32 mole % of ethylene (hereinafter referred to as "BR-3"); and polybutylene terephthalate ("C7000N" produced by Teijin Ltd.) having a specific gravity of 1.31, and a melting point of 225° C. (hereinafter referred to as "BR-4").

Resins for Forming Adhesive Layers

The following material was used as a resin for forming adhesive layers: polyethylene modified by maleic anhydride having a high-load melt flow rate of 10 g/10 min., and a density of 0.935 g/cm$^3$ (hereinafter referred to as "AD-1").

(2) Production of Hollow Multi-layer Moldings

In each of Examples 1 to 5, a suitable combination of layer materials for achieving a layer structure shown in Table 1 was used to produce moldings comprising first moldings containing no reclaimed material, and second moldings produced by using reclaimed material.

In each of Examples 1 to 5, each first molding was produced in the following manner: a prescribed type of high-molecular-weight polyethylene, the above adhesive layer resin, and a prescribed type of barrier layer resin were coextruded from a multi-layer die of a multi-layer blow molding machine (NB60G, produced by Japan Steel Works), so as to obtain a multi-layer molten parison having a three-type five-layer laminate structure comprising a polyethylene layer, an adhesive layer, a barrier layer, another adhesive layer, and another polyethylene layer. The mold was closed and the parison was blow-molded. Thus, hollow multi-layer moldings were obtained as the first moldings of each of Examples 1 to 5. The moldings had an inner volume of 70 l, a weight of 6.5 kg, and a barrier layer with a thickness of 150 μm. The moldings also had a thickness of approximately 5 mm, and a ratio in thickness among the polyethylene layers, the adhesive layers and the barrier layer of 91:6:3.

Reclaiming

Each second molding was produced by reclaiming multi-layer flash generated during the above molding. In each of Examples 1 to 5, reclaiming was performed in the following manner: Flash or the like generated during the molding of the first moldings was crushed by a crusher (having a mesh path with an opening diameter of 7 mm; produced by Horai Tekko K.K.), thereby obtaining crushed pieces having an average size of approximately 2 mm.

Then, the crushed pieces for the second moldings of each of Examples 1 to 5 were melted and kneaded with a biaxial kneader ("TEX", produced by Japan Steel Works, having a diameter of 44 mmφ) under conditions comprising a screw rotational speed of 250 rpm, resin temperature at exit of 280° C., a discharge rate of 55 kg/hour, and a specific energy of 0.3 to 0.4, thereby forming the crushed pieces into pellets of the relevant reclaimed material.

When the reclaimed-material pellets for the second moldings of each of Examples 1 to 5 were observed with an optical microscope, the pellets contained particles of barrier-layer resin dispersed therein, the particles having a size of not more than 100 μm.

Reclaimed-material pellets for each second molding Examples 1 to 5 were mixed with a quantity of a prescribed type of high-molecular-weight polyethylene at a proportion of 50 wt %:50 wt %, respectively, with respect to the total weight of the pellets and the polyethylene, and they were melted and kneaded together by a biaxial kneader of the above-described type under the above-specified conditions, thereby obtaining first pellets. The first pellets were again mixed with another quantity of the prescribed type of high-molecular-weight polyethylene at a proportion of 50 wt %:50 wt %, respectively, with respect to the total weight of the first pellets and the polyethylene, and they were similarly melted and kneaded together. Thereafter, such mixing and melting-kneading, which together constituted one pass, were repeated until ten passes were performed, thereby obtaining tenth pellets. Then, the tenth pellets were similarly mixed with a further quantity of the prescribed type of the high-molecular-weight polyethylene at a proportion of 50 wt %:50 wt %. Finally, the resulting pellets were molded to produce each second hollow multi-layer molding of Examples 1 to 5.

Thus, in Examples 1 to 5, moldings were produced by using five different combinations of materials in such a manner that each of Examples 2 to 5 contained a different high-molecular-weight polyethylene or barrier-layer material from that contained in Example 1, the moldings comprising first hollow multi-layer moldings containing no reclaimed material, and second hollow multi-layer molding containing reclaimed material subjected to repeated passes. Thereafter, the impact strength and the gas barrier properties of the moldings obtained in Examples 1 to 5 were evaluated by performing the following tests. The results of the evaluations are shown in Table (1) Gas Barrier Properties Tests In accordance with certain standards issued by the Japanese Ministry of Transport, each hollow multi-layer molding was filled with either approximately 15 kg of regular gasoline or a mixture of approximately 15 kg of regular gasoline with 20 wt % of methanol. A molded flat plate made of the same material as the molding was heat fused to the opening of the molding, thereby sealing the opening.

After the sealing, in accordance with certain standards issued by the Japanese Ministry of Transport, each molding, or tank, containing the fuel was kept in a steam oven chamber at a temperature of 40° C. for 20 days, and changes in the total weight of the molding and the fuel were simultaneously measured, so as to obtain an average permeation amount per day of moldings (i.e., the average of the amounts of fuel permeated through the moldings of the same Example and of the same kind regarding whether reclaimed material was used or not).

(2) Low-temperature Drop Impact Tests

Each hollow multi-layer molding was filled with an aqueous solution of ethylene glycol in such a manner that the weight of the molding serving as a tank and the solution totaled 70 kg, and the opening of the molding was suitably sealed. After the molding containing the solution was sufficiently cooled at $-40°$ C., the molding was dropped, with its pinch-off portion directed downward, from various heights, such as those shown in Table 1, to a concrete surface, and were then checked for cracks. Thus, a critical height for the moldings was obtained.

Comparative Examples 1 to 3

Resins for Forming Polyethylene Layers

<1> Preparation of High-molecular-weight Polyethylene (PE-3)

A so-called Phillips type catalyst, containing chromium oxide ($CrO_3$) adhering to the surface of a silica carrier, was prepared. Then, slurry polymerization which used the above catalyst and also used n-heptane as the solvent was performed, and the resulting polymer was formed into pellets, thereby obtaining an ethylene-butene copolymer to serve as a high-molecular-weight polyethylene (hereinafter referred to as "PE-3"). PE-3 had a high-load melt flow rate of 5 g/10 min., and a density of 0.948 g/cm$^3$. PE-3 was used as the resin for forming the polyethylene layer of Comparative Example <2> Preparation of High-molecular-weight Polyethylene (PE-4)

A highly-active Ziegler-type catalyst containing a titanium catalyst component retained by a halogenated-magnesium-containing compound, and an organic aluminum compound, was prepared. Then, multi-vessel continuous slurry polymerization which used the above catalyst and also used n-heptane as the solvent was performed, and the resultant polymer was formed into pellets, thereby obtaining an ethylene-butene copolymer to serve as another high-molecular-weight polyethylene (hereinafter referred to as "PE-4"). PE-4 had a high-load melt flow rate of 4.7 g/10 min., and a density of 0.946 g/cm$^3$. PE-4 was used as the resin for forming the polyethylene layer of Comparative Example 2.

Resin for Forming Barrier Layers

The above-described type BR-1 was used as the material for forming the barrier layer of each of Comparative Examples 1 and 2.

Resin for Forming Adhesive Layers

The above-described type AD-1 was used as the material for forming the adhesive layer of each of Comparative Examples 1 and 2.

In each of Examples 1 and 2, a suitable combination of layer materials for achieving a layer structure shown in Table 1 was used, and multi-layer molding and reclaiming, similar to those in Examples 1 to 5, were performed, thereby producing hollow multi-layer moldings.

In Comparative Example 3, hollow single-layer moldings, each having a layer structure consisting only of the polyethylene layer of PE-1, were produced.

Then, the impact strength and the gas barrier properties of the moldings obtained in Comparative Examples 1 to 3 were evaluated by performing tests similar to those for Examples 1 to 5. The results of the evaluation are shown in Table 1.

As shown in Table 1, the moldings of Examples 1 to 5 were superior to Comparative Examples 1 to 3 in gas barrier properties and critical height in low-temperature drop impact tests. Critical heights of Examples 1 to 5 can be greater than 10 m even when produced by using reclaimed material. In view of the fact that 6 m is the standard height generally used in similar drop tests by vehicle manufacturers, it is seen that hollow multi-layer moldings according to the present invention have excellent impact strength.

As has been described above, a hollow multi-layer molding according to the present invention has the excellent gas barrier properties required of vehicle fuel tanks or the like, allows improved reclaiming of flash or like material, and has excellent impact strength even when the molding is produced by reclaiming flash, etc. so that the molding can contain reclaimed material. Thus, the molding according to the present invention is of great industrial value when used as a fuel tank for vehicles or the like.

TABLE 1

| | EXAMPLE No. | | | | | | | |
|---|---|---|---|---|---|---|---|---|
| | 1 | | 2 | | 3 | | 4 | |
| Reclaim | No | Yes | No | Yes | No | Yes | No | Yes |
| Layer constitution: | | | | | | | | |
| Main layer | PE-1 | PE-1 + R.M. (50 wt %) | PE-2 | PE-2 + R.M. (50 wt %) | PE-1 | PE-1 + R.M. (50 wt %) | PE-1 | PE-1 + R.M. (50 wt %) |
| Barrier layer | BR-1 | BR-1 | BR-1 | BR-1 | BR-2 | BR-2 | BR-3 | BR-3 |
| Adhesive layer | AD-1 | AD-1 | AD-1 | AD-1 | AD-1 | AD-1 | AD-1 | AD-1 |
| Low temperature drop impact test (Critical | >10 | >10 | >10 | >10 | >10 | >10 | >10 | 8 |

TABLE 1-continued

|  | | | | | | | | |
|---|---|---|---|---|---|---|---|---|
| drop height (m)) Gas barrier test (g/day/tank): | | | | | | | | |
| Gasoline | 0.2 | 0.2 | 0.2 | 0.2 | 0.3 | 0.3 | 0.9 | 0.9 |
| Gasoline/Methanol (80/20 by wt.) | 7.4 | 7.5 | 7.4 | 7.5 | 7.8 | 8.0 | 1.2 | 1.1 |

|  |  | EXAMPLE No. | | COMPARATIVE EXAMPLE No. | | | | |
|---|---|---|---|---|---|---|---|---|
|  |  | 5 | | 1 | | 2 | | 3 |
|  | Reclaim | No | Yes | No | Yes | No | Yes | No |
|  | Layer constitution: | | | | | | | |
|  | Main layer | PE-1 | PE-1 + R.M. (50 wt %) | PE-3 | PE-3 + R.M. (50 wt %) | PE-4 | PE-4 + R.M. (50 wt %) | PE-1 |
|  | Barrier layer | BR-4 | BR-4 | BR-1 | BR-1 | BR-1 | BR-1 | |
|  | Adhesive layer | AD-1 | AD-1 | AD-1 | AD-1 | AD-1 | AD-1 | |
|  | Low temperature drop impact test (Critical drop height (m)) Gas barrier test (g/day/tank): | >10 | 8 | 6 | 4 | >10 | 2 | >10 |
|  | Gasoline | 0.5 | 0.5 | 0.2 | 0.2 | 0.2 | 0.2 | 15.1 |
|  | Gasoline/Methanol (80/20 by wt.) | 0.8 | 0.7 | 7.4 | 7.6 | 7.6 | 7.8 | 12.8 |

PE-1: Polyethylene produced by using a silyl chromate catalyst
PE-2: Polyethylene produced by using a silyl chromate catalyst
PE-3: Polyethylene produced by using a CrO$_3$ catalyst
PE-4: Polyethylene produced by using a Ziegler catalyst
R.M.: Reclaimed material
BR-1: Nylon-6,
BR-2: Nylon-6,66,
BR-3: EVAL (trade name),
BR-4: Polybutylene terephthalate
AD-1: Maleic anhydride-modified polyethylene

What is claimed is:

1. A hollow multi-layer molding made of a multi-layer laminate material, said multi-layer laminate material comprising:
  i) a polyethylene layer;
  ii) a barrier layer comprising a substance selected from the group consisting of a polyamide resin, a saponified derivative of an ethylene-vinyl acetate copolymer, a thermoplastic polyester, and a mixture of at least two of said polyamide resin, said saponified derivative and said thermoplastic polyester; and
  iii) an adhesive layer of a modified polyethylene obtained by modifying polyethylene with 0.005 to 10% by weight of an unsaturated carboxylic acid or anhydride thereof, said polyethylene layer and said barrier layer being laminated to each other with said adhesive layer sandwiched therebetween, said polyethylene layer being made of a high-molecular-weight polyethylene obtained by using a reducing agent, comprising an alkylaluminum alkoxide of formula:

where x and y are integers of 1 or 2 which total 3; and R' and R'' each represent a C$_{1-14}$ hydrocarbon group, and a silyl chromate catalyst of formula (III):

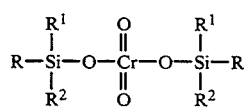
(III)

where R$^1$ and R$^2$ each represent a C$_{1-14}$ hydrocarbon group, said high-molecular-weight polyethylene having a high-load melt flow rate (at a temperature of 190° C. under a load of 21.6 kg) of 3 to 8 g/10 min., and a density of 0.940 to 0.970 g/cm$^3$.

2. A hollow multi-layer molding according to claim 1 wherein said polyethylene layer contains flash generated during the molding of said multi-layer laminate material into said hollow multi-layer molding.

3. A hollow multi-layer molding according to claim 1 wherein said silyl chromate comprises one silyl chromate selected from the group consisting of bis(tri(phenyl)silyl) chromate, bis(tri(methylnaphthyl)silyl) chromate, bis(tri(ethylphenyl)silyl) chromate, bis(tri(naphthyl)silyl) chromate, bis(tri(xylyl)silyl) chromate and bis(tri(tolyl)silyl) chromate.

4. A hollow multi-layer molding according to claim 1 wherein said multi-layer laminate material has a three layer structure comprising a polyethylene layer, an adhesive layer made of a modified polyethylene resin, and a barrier layer subsequently disposed in this order, said barrier layer being made of a substance selected from the group consisting of polyamide resins, saponified derivatives of ethylene-vinyl acetate copolymers, thermoplastic polyesters, and a mixture of at least two of said polyamide resin, said saponified derivative, and said thermoplastic polyester.

5. A hollow multi-layer molding according to claim 1 wherein said multi-layer laminate material has a five layer structure comprising a first polyethylene layer, a first adhesive layer made of a modified polyethylene resin, a barrier layer, a second adhesive layer made of a modified polyethylene resin, and a second polyethylene layer subsequently disposed in this order, said barrier layer being made of a substance selected from the group consisting of polyamide resins, saponified derivatives of ethylene-vinyl acetate copolymers, thermoplastic polyesters, and a mixture of at least two of said polyamide resin, said saponified derivative and said thermoplastic polyester.

6. A hollow multi-layer molding according to claim 1 wherein said barrier layer is made of a polyamide resin.

7. A hollow multi-layer molding according to claim 1 wherein said barrier layer is made of a saponified derivative of ethylene-vinyl acetate copolymer.

8. A hollow multi-layer molding according to claim 1 wherein said barrier layer is made of a thermoplastic polyester.

9. A hollow multi-layer molding according to claim 1 wherein the unsaturated carboxylic acid anhydride is maleic anhydride.

* * * * *